United States Patent
Holt

(10) Patent No.: US 7,315,976 B2
(45) Date of Patent: Jan. 1, 2008

(54) METHOD FOR USING CRC AS METADATA TO PROTECT AGAINST DRIVE ANOMALY ERRORS IN A STORAGE ARRAY

(75) Inventor: Keith W. Holt, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 116 days.

(21) Appl. No.: 10/066,270

(22) Filed: Jan. 31, 2002

(65) Prior Publication Data

US 2003/0145270 A1    Jul. 31, 2003

(51) Int. Cl.
*H03M 13/00*    (2006.01)
*G11C 29/00*    (2006.01)

(52) U.S. Cl. .................. 714/769; 714/766; 714/770; 714/6; 719/325; 711/114

(58) Field of Classification Search ............... 714/766, 714/769, 770, 6; 719/325; 711/114
See application file for complete search history.

(56) References Cited

U.S. PATENT DOCUMENTS

| | | | | |
|---|---|---|---|---|
| 5,265,104 A | * | 11/1993 | Weng | 714/766 |
| 5,274,645 A | * | 12/1993 | Idleman et al. | 714/6 |
| 5,331,646 A | * | 7/1994 | Krueger et al. | 714/766 |
| 5,333,143 A | * | 7/1994 | Blaum et al. | 714/766 |
| 5,390,327 A | * | 2/1995 | Lubbers et al. | 714/7 |
| 5,398,253 A | * | 3/1995 | Gordon | 714/766 |
| 6,023,780 A | * | 2/2000 | Iwatani | 714/770 |
| 6,678,107 B1 | | 1/2004 | Krehbiel et al. | |
| 6,742,137 B1 | | 5/2004 | Frey, Jr. | |
| 6,769,088 B1 | * | 7/2004 | Weng | 714/766 |

OTHER PUBLICATIONS

"A fast Reed-Solomon and cyclic redundancy check encoding algorithm for optical disk error control," IEEE International ASIC Conference and Exhibit/Proceedings., Sep. 19-23, 1994, pp. 250-253.—Author(s)—Kao et al.

* cited by examiner

*Primary Examiner*—Joseph D. Torres
(74) *Attorney, Agent, or Firm*—Suiter Swantz PC LLO

(57) ABSTRACT

The present invention is directed to a method and system for disk drive data recovery utilizing CRC information and RAID parity. CRC meta data is compared with either the CRC generated from the data read from the disk drive or the CRC generated from the data reconstructed from the parity drive. If the CRC metadata matches the CRC generated from the data read from the disk drive, the data from the disk drive is accepted as valid. Otherwise, another comparison is made between the CRC generated from data reconstructed from RAID parity and the CRC metadata. If there is a match, the reconstructed data is used as the valid data; otherwise, the data read from the disk drive is used as valid data.

15 Claims, 4 Drawing Sheets

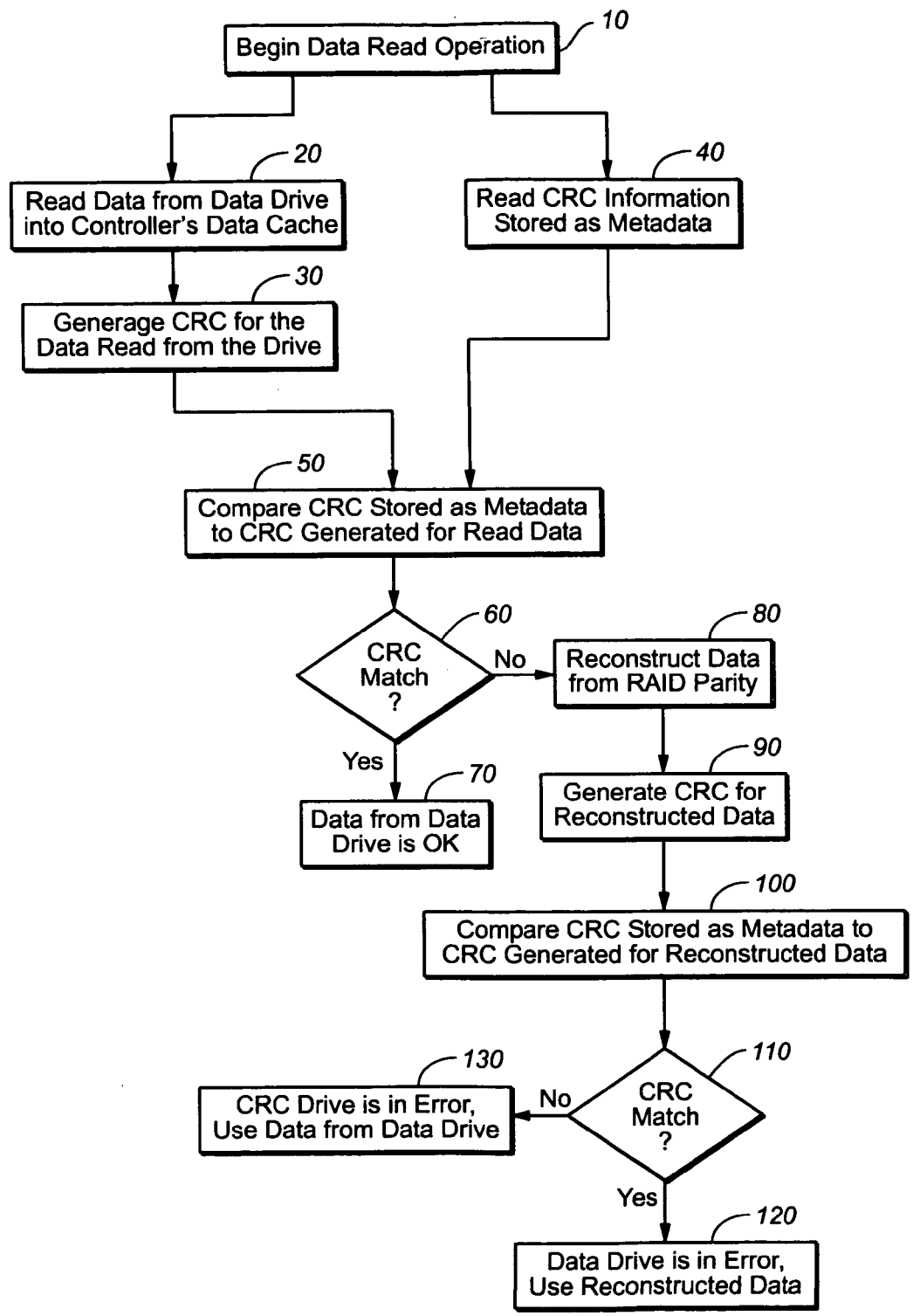
FIG._1

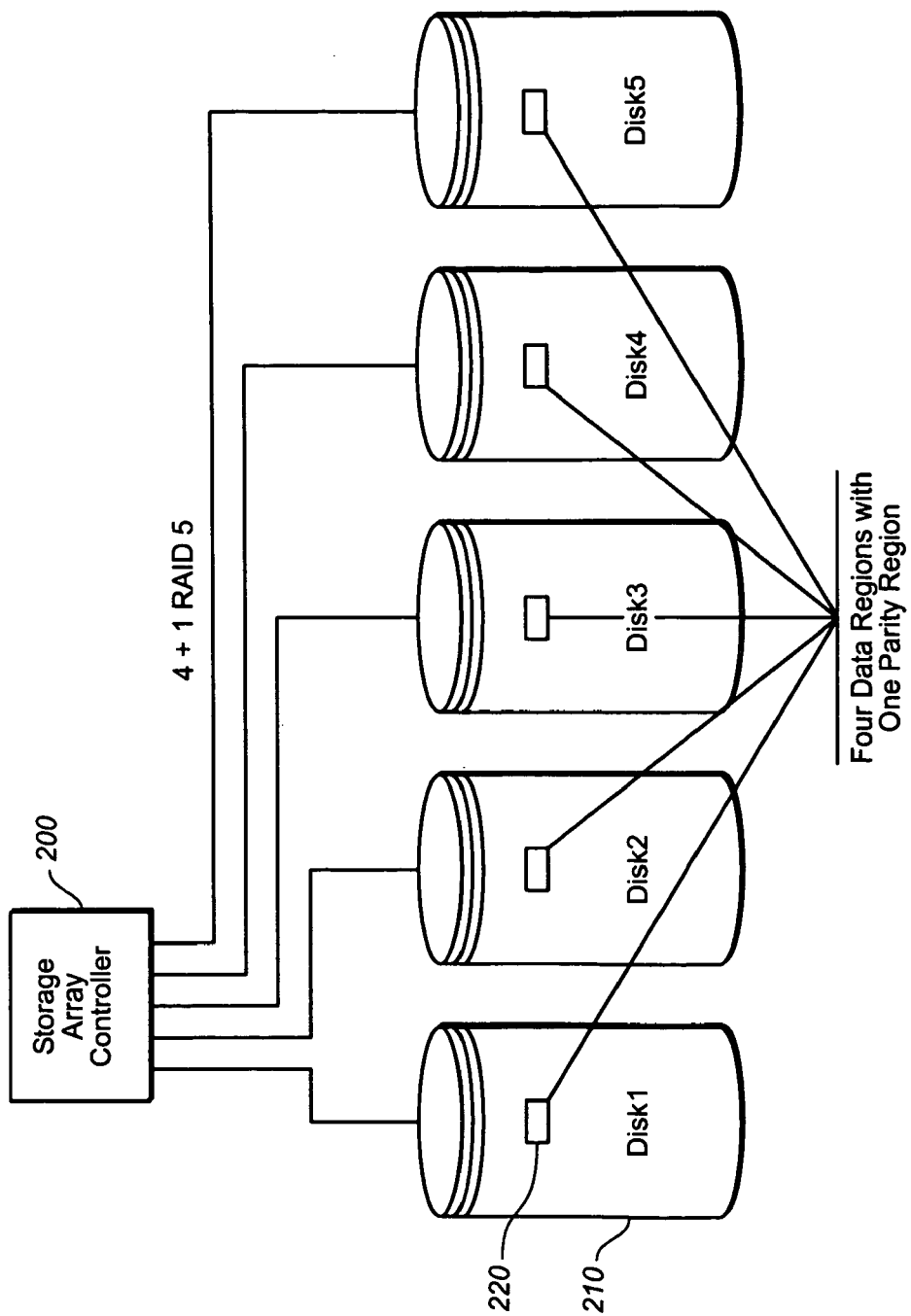
FIG._2

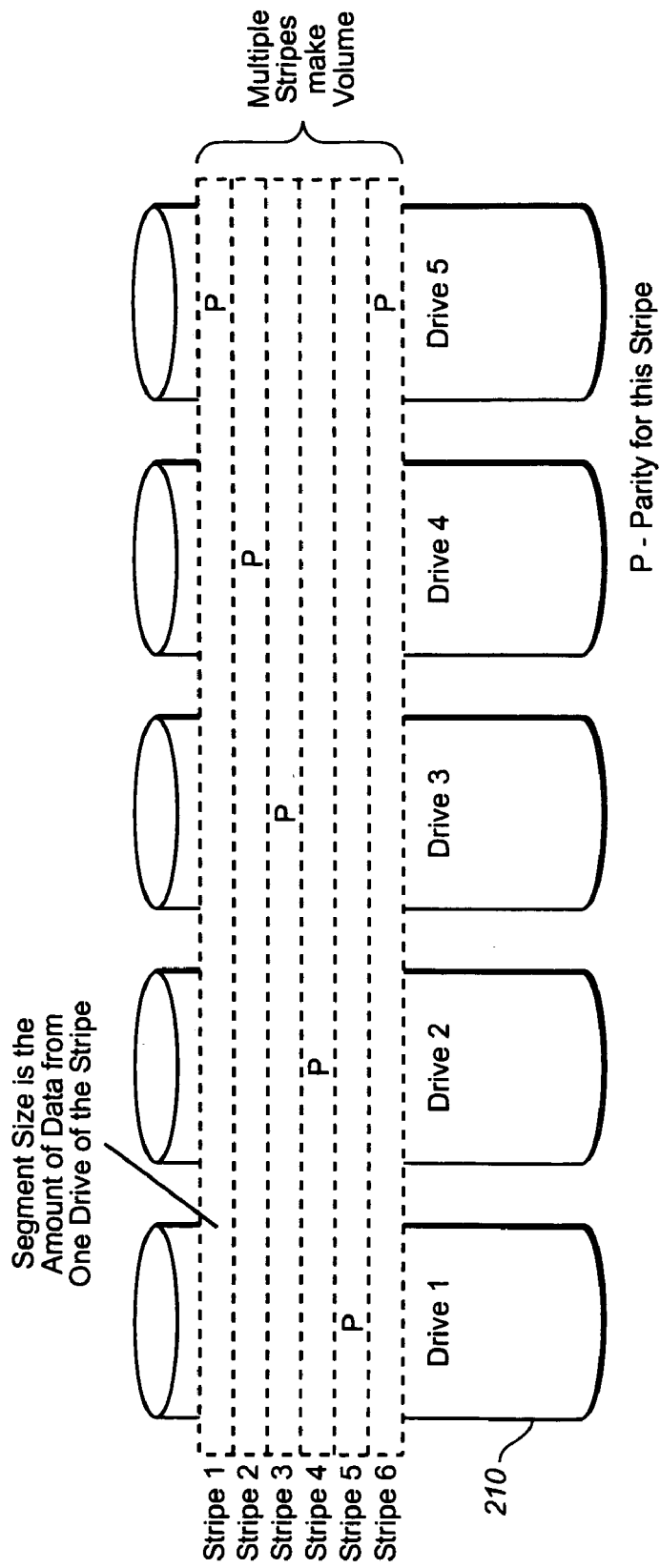
FIG._3

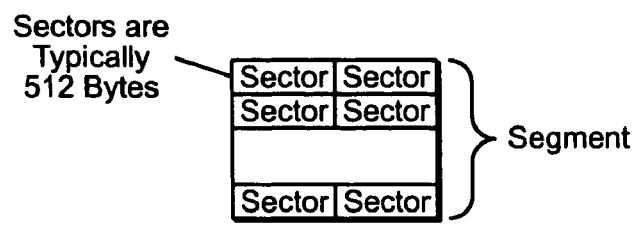
FIG._4

METHOD FOR USING CRC AS METADATA TO PROTECT AGAINST DRIVE ANOMALY ERRORS IN A STORAGE ARRAY

FIELD OF THE INVENTION

The present invention generally relates to the field of computer storage, and particularly, to high availability storage arrays utilizing disk drives as the storage media.

BACKGROUND OF THE INVENTION

An established technology that provides large disk capacity with very high reliability is a redundant array of independent disk drives (RAID). RAID uses multiple physically separate disk drives which act as a single drive and all are accessed through a single array controller. The physically separate disk drives may appear as multiple virtual drives. There is typically more than one controller in a system for redundancy, although normally only one controller at a time can access data in a volume. For data reliability, a parity block is derived from related data blocks of the various disk drives through exclusive-or (XOR) operations, permitting the rebuilding of data from one disk drive that fails by processing the data of the other drives along with the parity block. Data may be stored as a sector, a segment, a stripe, or a volume, across the disk drives of a RAID system.

In extremely rare instances, a disk drive may return incorrect data without indicating that an error has occurred. These types of errors can occur both when writing data to, and reading data from, media. For example, the drive may write data to the wrong physical address. Similarly, the drive may read data from the wrong physical address. There are other types of drive anomaly errors, but they all share a common characteristic: the initiator of any read or write request should assume that part or all of the data may be incorrect even though there is no error indication from the drive.

In a high availability storage array, it is desirable to detect and, if possible, recover from drive anomaly errors. In general, data recovery is possible through RAID parity schemes as long as the storage array is able to identify the drive in error.

It is relatively common to provide data path protection through the use of CRC alone, but such a scheme does not recover from drive anomalies such as dropped or misdirected write operations. Data path protection schemes typically format the drives to a larger sector size (size as 520 bytes), and store the CRC for each 512 bytes of user data in the larger sector.

One approach to solving the problem is to store write sequence tracking metadata interleaved with user data. The sequence information is stored on two separate disks as metadata during write operations. Anomaly protection is provided by having the write sequence tracking information on two separate drives. The data and metadata are interleaved for performance reasons. Interleaving allows the data and associated metadata on each drive to be either written or read with a single I/O operation. If the sequence information on the data drive differs from the parity drive, the sequence information can be used to determine which drive is in error. If the data drive is in error, the data is extracted from the parity drive via reconstruction techniques.

With this approach, writes are tracked at two levels of granularity. The first level is when the scope of a write operation is limited to an individual drive plus the associated parity drive. In this case, the level of granularity is a data block such as the cache block size used to manage the storage controller's data cache. A data block may be as large as a segment (i.e., the amount of data from one drive of a stripe) or as small as a sector (i.e., a logical block forming part of a segment). Each data block within a data stripe has its own separate revision number. The revision numbers of all data blocks are stored on the associated parity drive.

In this case, a data block is the unit of data for which metadata is managed (one or more sectors). The size is chosen based on a trade-off between disk capacity utilization and performance. The easiest way to manage metadata is by placing all metadata (write sequence information plus CRC) for a given data block in a single sector. The smaller the data block, the more disk space is used for metadata. On the other hand, as the data block size increases, it increases the likelihood that the host I/O size will be smaller than the data block size, which means, for example, that extra data will have to be read and discarded on read operations. The controller's data cache block size is likely to vary based on the same considerations, so it is convenient to link the metadata data block management size to the cache block size.

The second level of granularity is when all data blocks within a stripe are written. Each storage controller maintains a monotonically increasing value that is used to track full stripe writes on a storage controller basis. Tracking full stripe writes separately allows the controller to avoid having to perform a read-modify-write function on all of the associated data block revision numbers. When a full stripe write occurs, all data block revision numbers are initialized to a known value.

In order to provide complete data integrity protection, the write sequence tracking scheme must be implemented in conjunction with CRC or other form of error detection and correction code that provides data integrity assurance at a byte level to protect against drive anomaly errors in which the majority of data in the sector or sectors is correct. The CRC information can be stored as metadata along with the write sequence tracking information.

The write sequence tracking mechanism has the limitation that drive anomaly errors are either unrecoverable or undetectable for certain failure modes. The problem arises from the fact that the data block revision numbers protect the data drives, but not the parity drive. Since data block revision numbers for all data blocks across the stripe are stored in the same sector on the parity drive for space considerations, a dropped write to the parity drive may not be detected prior to the parity drive being updated for another data block in the stripe.

In addition, the write sequence tracking mechanism is relatively complex to implement. The metadata has self-identification features that must be managed. In a system with redundant storage controllers, management of the numbers must account for transfer of volume ownership between the controllers. In addition, the sequence number management must account for transfer of volume ownership between the controllers.

Finally, there is a certain lack of flexibility in how the metadata is managed since it is typically linked to the cache block size used to manage the storage controller's data cache.

Therefore, it would be desirable to provide a system and method for recovering from disk drive anomalies which offers simplicity, symmetrical protection for data and parity drives, and flexible management for the metadata.

SUMMARY OF THE INVENTION

Accordingly, the present invention is directed to the use of CRC or similar error detection and correction code as the sole means of providing both drive anomaly and data path data integrity protection. In order to accomplish this, the CRC information must be stored as metadata separate from the associated data block.

In a first aspect of the present invention, a method for data recovery in a disk drive system includes the steps of reading data from a disk drive and generating a CRC from the data read from the disk drive. In parallel to these steps, CRC metadata is retrieved for doing a comparison. The CRC metadata is used a second time if the first comparison does not provide a match. The data is determined to be valid if the CRC metadata matches the CRC calculated on data read from the drive. If the CRC metadata does not match the CRC calculated on the data read from the drive, then the disk array controller must determine if the data drive or metadata drive is in error. To do this, the disk array controller reconstructs the data using RAID parity information. The CRC is calculated for the reconstructed data and compared to the CRC metadata. If there is a match, then the data drive was in error, and the reconstructed data is considered to be correct. If there is not a match, then it is likely that the metadata drive is in error. This can be verified by comparing the CRC for the reconstructed data against the CRC calculated when data was read from the drive.

In a second aspect of the present invention, a system for data storage management and data recovery includes a disk array controller and a plurality of disk drives coupled to the disk array controller. The disk array controller uses CRC metadata to make an initial determination as to whether data read from a disk drive is valid.

The advantages of this invention are as follows:

Simplicity. CRC information is the only metadata that must be managed. This information is controller independent, so there are no implementation considerations regarding which controller is accessing the information.

Symmetrical protection for data and parity drives. This invention makes no distinction between user data and parity information stored for redundancy. CRC is generated as its corresponding data is received to be written to the data drives, stored as metadata, and checked for the parity drive in a stripe just as it is for the data drives.

Flexibility in managing the metadata. In other schemes, metadata is managed at the granularity of a data block that typically matches the cache block size used to manage the storage controller's data cache. This reduces flexibility in that metadata management is closely associated with the cache block size. If the controller's cache block size is changed, it may require all data on all drives to be reformatted. Similarly, a volume created on another storage array with a different cache block size may need to be reformatted before the data integrity protection scheme can be used. This invention allows metadata to be managed at the granularity of a sector since CRC is generated and checked on a sector basis.

Since metadata may be managed at the granularity of sector, there is complete flexibility as to how the metadata may be managed with the present invention. Since there are typically only a few bytes of CRC (2-4) per 512 bytes of user data to be stored, several sectors of CRC may be stored together as a unit. This unit may be a "data block" size, or it may be larger such as a segment.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 illustrates a flowchart of the data retrieval and verification process of the present invention;

FIG. 2 illustrates the system having a storage array controller and several disk drives;

FIG. 3 illustrates data striping across several disk drives; and

FIG. 4 illustrates the makeup of a data segment.

DETAILED DESCRIPTION OF THE INVENTION

Reference will now be made in detail to the presently preferred embodiments of the invention, examples of which are illustrated in the accompanying drawings.

Referring generally now to FIGS. 1 through 4, exemplary embodiments of the present invention are shown.

A RAID consists of multiple storage units arranged in a redundant fashion to provide data integrity in the event of device failure. Recovery from many failures is performed within the memory storage system itself by data redundancy, error codes, and redundant storage units activated in case of device failure.

RAID storage subsystems utilize a disk array controller that automates managing the redundant array, making operation transparent to the user. The controller makes the system appear to the host computer as a single, highly reliable, high capacity disk drive. In reality, the RAID controller distributes data across multiple small independent drives with redundancy and error checking information to improve reliability.

There are several redundancy levels associated with RAID. Certain RAID levels segment the data into portions for storage across several data disks. RAID levels 2-5 utilize XOR parity to provide requisite redundancy. One of more additional disks are utilized to store error check or parity information. The data may be stored as a stripe of data areas distributed across several disks. Striping improves overall performance by using concurrency to reduce the wait time involved in larger I/O operations in that several drives simultaneously process an I/O request. RAID level 5 uses striping as part of internal management functions.

Under the control of a drive array controller, sector interleaving or striping is used to increase the data bandwidth. The purpose of sector interleaving or striping is to assure data integrity in case a disk is lost. Sector interleaving is basic to the redundancy algorithm.

High reliability is one of the key requirements of high availability storage arrays. One aspect of reliability is data integrity. Data from the host should be stored and retrieved without error. An implicit requirement is that the storage array should anticipate and guard against failure in any component of the storage array.

A complete drive anomaly data integrity protection scheme should protect against drive anomaly errors in which the majority of the data in the sector or sectors are correct in addition to errors involving the entire data block. This requires the use of CRC or some similar form of error detection and correction code that provides data integrity assurance at a byte level. CRC is an error detection method that uses parity bits generated by polynomial encoding of the data. It appends those parity bits to the data word. The receiving devices have decoding algorithms that detect errors in the data word. The algorithm treats all bit streams as binary polynomials. CRC may be implemented through hardware. This may be done using a shift register and exclusive OR gating circuitry. Software algorithms may also be employed. This invention utilizes CRC to provide both drive anomaly and data path data integrity protection. In order to accomplish this, the CRC information must be stored as metadata separate from the associated data block. The CRC information may be generated and managed at a sector level. This invention does not preclude including information such as an associated volume logical block address range for debug purposes.

A portion of disk drive capacity may be dedicated to the storage of metadata, including CRC metadata. There are no restrictions to where metadata may be stored. It may be stored on a separate drive, in an area of the disk that is completely separate from the user data, or even interleaved with the user data on a drive or drives. The metadata, in one embodiment, may be stored on the same drives as the user data. This invention imposes no requirements or indicates preferences as to where exactly the data is stored or how it is managed. Metadata may be stored at the same time as the user data. The CRC may be generated as data is received by the disk array controller.

The CRC information that is stored on the drives may be used to verify data path integrity at a byte level on subsequent read operations. By storing the CRC information on a drive separate from the associated data block, this invention allows the CRC to be used to detect drive anomalies at a byte level, as well. On read operations, both the data block and the associated CRC information may be read from their respective drives. CRC may be generated for the data read from disk and compared against the CRC that was stored as metadata. If the check fails, data may be extracted from the parity drive via normal reconstruction techniques. CRC for the reconstructed data may be generated and compared against the CRC stored as metadata. If the CRC for the reconstructed data matches the CRC stored as metadata, then it can safely be assumed that the data drive is in error. If the CRC for the reconstructed data does not match the CRC stored as metadata, then it can reasonably be assumed that the CRC drive is in error. In this case, the reconstructed data may be compared against the original data as an additional data integrity check.

FIG. 1 illustrates a flowchart of the data retrieval and verification process of the present invention. A data operation is commenced, in step 10. In the data operation, data is read from the data drive into the controller's data cache, step 20, and a CRC is generated for the data read from the drive, step 30. In parallel, the CRC information stored as metadata is read, step 40. The generated CRC and stored CRC are compared, steps 50 and 60. If they are the same, the data from the data drive is presumed to be valid, step 70. Otherwise, the data is reconstructed using RAID parity, step 80. A CRC is generated from the reconstructed data, step 90. The CRC stored as metadata is compared to the CRC generated for the reconstructed data, steps 100 and 110. If they are the same, the data drive is presumed to be in error and the reconstructed data is used, step 120. Otherwise, the CRC drive is presumed to be in error and the data drive data is presumed to be valid, step 130.

CRC information may be generated and checked in various ways. There may be some sort of hardware assist that may be available for performance reasons. In fact, the implementation may be performed in hardware, software, or a combination of hardware and software. When reading data from the disk, CRC can be generated on the fly or after the data has been received into the controller's data cache. The data integrity check may be performed with a CRC generated from well-known polynomials, or some alternate form of error detection and correction code. Other forms of error detection and correction code include, but are not limited to, Hamming codes, maximum-length codes, Bose-Chaudhuri-Hocquenghem Codes, Reed-Solomon Codes, and Convolutional Codes. The method of managing the CRC metadata may vary, but it must store data in a write operation separate from the write operation for the data. Also, it may be stored to a separate drive.

FIG. 2 shows a 4+1 RAID 5 implementation in which 4 data blocks 220 are exclusive or'ed together to create a parity block. In this example, five disk drives 210 are controlled by the storage array controller 200. RAID 5 data is striped at a block level across multiple parallel data disks. RAID 5 implements parity in a distributed fashion as opposed to using a fixed parity disk. That is, the data and parity information are arranged on the disk array so that they alternate between different disks. This distributed parity methodology removes the parity disk from being a potential bottleneck, as can happen in RAID 3 or RAID 4. As in RAID 4, a RAID 5 tripe depth is an integer multiple of (equal to or greater than) the virtual block size.

FIG. 3 illustrates a 4+1 RAID 5 storage array. With striping, access times to the disk may be reduced and performance improved. Striping is a way of deploying RAID technology. The stripe size may be set. Stripe set sizes define the width of a unit of data that can be allocated at a time.

FIG. 4 illustrates a segment. The chosen segment size is 32K. Segment size is the amount of data from one drive of the stripe. A segment consists of logical blocks called disk sectors. Typically, sectors are 512 bytes.

It is believed that the method for using CRC or other error detection and correction code as metadata to protect against drive anomaly errors in a storage array of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for data recovery in a disk drive system wherein the disk drive system includes a data disk drive and a disk drive controller, comprising the steps of:
   reading data from the data disk drive;
   generating an error detection and correction code from the data read from the data disk drive; and
   in parallel with the reading of the data from the data disk drive and the generating an error detection and correction code from the data read from the data disk drive, reading error detection and correction code metadata;

comparing the generated error detection and correction code of the read data with the error detection and correction code stored as metadata;

determining data validity of data read from the data disk drive based on the comparison of error detection and correction code metadata and the generated error detection and correction code; and debugging the system via implementation of an associated volume logical block address range included with at least one of the read data, the generated error detection and correction code and the error detection and correction code stored as metadata, wherein the error detection and correction code metadata is stored in a disk drive separate from the data read from the data disk drive, wherein the error detection and correction code is a cyclic redundancy check, wherein the error detection and correction code of the read data and the error detection and correction code stored as metadata allow for verification of data path integrity at a byte level and detection of drive anomalies at a byte level, wherein the cyclic redundancy check is generated and managed at a sector level.

2. The method of claim 1, if the generated error detection and correction code of the read data matches the error detection and correction code stored as metadata, then accepting the data read from the data disk drive as valid data.

3. The method of claim 1, if the generated error detection and correction code of the read data does not match the error detection and correction code stored as metadata, then reconstructing data from parity data.

4. The method of claim 3, further comprising generating an error detection and correction code for the reconstructed data.

5. The method of claim 4, further comprising comparing the error detection and correction code stored as metadata with the generated error detection and correction code for the reconstructed data.

6. The method of claim 5, if the error detection and correction code stored as metadata matches the reconstructed data error detection and correction code, then accepting the reconstructed data as valid data.

7. The method of claim 5, if the error detection and correction code stored as metadata does not match the reconstructed data error detection and correction code, then accepting the data read from the data drive as valid data.

8. The method of claim 3, wherein the error detection and correction code metadata, the parity data, and the data read from the data disk drives are all stored on separate disk drives.

9. The method of claim 1, wherein the size of the error detection and correction code metadata is a data block.

10. The method of claim 1, wherein the size of the error detection and correction code metadata is 4 bytes per 512 bytes of data read from the data disk drives.

11. A method of disk drive data detection and recovery, comprising:

reading error detection and correction code metadata associated with data read from a data disk drive;

generating error detection and correction code for the data;

determining data validity of data read from the data disk drive based on the error detection and correction code metadata and the generated error detection and correction code; and debugging via implementation of an associated volume logical block address range included with at least one of the read data, the generated error detection and correction code and the error detection and correction code stored as metadata, wherein the error detection and correction code metadata is stored in a disk drive separate from the data disk drive, wherein the error detection and correction code is cyclic redundancy check, wherein the error detection and correction code metadata and the generated error detection and correction code allow for verification of data path integrity at a byte level and detection of drive anomalies at a byte level, wherein the cyclic redundancy check is generated and managed at a sector level.

12. The method of claim 11, wherein the error detection and correction code metadata is compared against the generated error detection and correction code from the data read from the data disk drive.

13. The method of claim 11, wherein the error detection and correction code metadata is compared against an error detection and correction code generated from data reconstructed using parity data.

14. The method of claim 11, wherein, if the error detection and correction code metadata equals the error detection and correction code generated from the data disk drive or if the error detection and correction code metadata does not equal the error detection and correction code generated from data reconstructed from parity, then accepting the data read from the data disk drive as valid.

15. The method of claim 11, wherein, if the error detection and correction code metadata equals the error detection and correction code generated from data reconstructed from parity, then accepting the data reconstructed from parity as valid.

* * * * *